United States Patent
Fu et al.

(10) Patent No.: US 9,330,049 B2
(45) Date of Patent: May 3, 2016

(54) METHOD AND APPARATUSES FOR MONITORING SYSTEM BUS

(71) Applicant: Huawei Technologies Co., Ltd., Shenzhen (CN)

(72) Inventors: Qiang Fu, Chengdu (CN); Xiping Zhou, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 414 days.

(21) Appl. No.: 13/864,471

(22) Filed: Apr. 17, 2013

(65) Prior Publication Data
US 2013/0282939 A1    Oct. 24, 2013

(30) Foreign Application Priority Data

Apr. 17, 2012 (CN) .......................... 2012 1 0112839

(51) Int. Cl.
*G06F 13/42*    (2006.01)
*G06F 11/00*    (2006.01)

(52) U.S. Cl.
CPC ............ *G06F 13/4286* (2013.01); *G06F 11/00* (2013.01); *G06F 13/42* (2013.01)

(58) Field of Classification Search
USPC ............ 710/105, 110; 714/37, 43, 44, 45, 46
See application file for complete search history.

(56) References Cited

U.S. PATENT DOCUMENTS 5,210,862 A * 5/1993 DeAngelis et al. ............. 714/45
7,412,633 B2 * 8/2008 Kimelman et al. ........... 714/724

(Continued)

FOREIGN PATENT DOCUMENTS

| CN | 101334760 A | 12/2008 |
| CN | 101587460 A | 11/2009 |
| CN | 101788947 A | 7/2010 |

(Continued)

*Primary Examiner* — Khanh Dang
(74) *Attorney, Agent, or Firm* — Brinks Gilson & Lione

(57) ABSTRACT

Embodiments of the present invention provide a method and apparatuses for monitoring a system bus. The method includes: performing, by a monitoring apparatus, real-time monitoring on a corresponding system bus, and when detecting that a command is transmitted through the system bus, obtaining command information; determining, according to the command information, whether a command transmission exception occurs in the system bus; if no command transmission exception occurs in the system bus, when detecting that data corresponding to the command is transmitted through the system bus, determining, according to the data and the amount of the data, whether a command exception occurs in the system bus; and when detecting that a response message corresponding to the command is transmitted through the system bus, obtaining a command wait time of the command, and determining, according to the command wait time, whether a timeout exception occurs in the system bus.

14 Claims, 11 Drawing Sheets

(56) References Cited

U.S. PATENT DOCUMENTS

| | | |
|---|---|---|
| 7,917,719 B2 * | 3/2011 | Elhamias et al. ............. 711/167 |
| 7,949,986 B2 * | 5/2011 | Gehman ....................... 716/138 |
| 2002/0059511 A1 | 5/2002 | Sudo et al. |
| 2004/0103249 A1 * | 5/2004 | Lin ............................... 711/118 |
| 2005/0034026 A1 * | 2/2005 | Swaine et al. ................. 714/43 |
| 2006/0203740 A1 * | 9/2006 | Chang et al. ................. 370/252 |
| 2008/0077749 A1 * | 3/2008 | Cohen .......................... 711/152 |
| 2009/0254310 A1 * | 10/2009 | Kanzaki et al. .............. 702/186 |
| 2009/0287867 A1 | 11/2009 | Takehara et al. |
| 2011/0197002 A1 | 8/2011 | Deng et al. |
| 2011/0225589 A1 | 9/2011 | Pirog et al. |
| 2013/0219452 A1 * | 8/2013 | Liu et al. .......................... 726/1 |

FOREIGN PATENT DOCUMENTS

| | | |
|---|---|---|
| CN | 102360329 A | 2/2012 |
| JP | 2002-149442 A | 5/2002 |
| JP | 2009-087149 | 4/2009 |

* cited by examiner

METHOD AND APPARATUSES FOR MONITORING SYSTEM BUS

CROSS-REFERENCE TO RELATED APPLICATION

This application claims priority to Chinese Patent Application No. 201210112839.5, filed on Apr. 17, 2012, which is hereby incorporated by reference in its entirety.

FIELD OF THE INVENTION

The present invention relates to the field of communications, and in particular, to a method and apparatuses for monitoring a system bus.

BACKGROUND OF THE INVENTION

With the continuous development of technologies, and quick changes of needs of product applications, the integration level of communication chips is higher and higher, and functions of the chips become more and more complex. As the integration level is high and the functions of the communication chips are complex, a soft failure of the communication chips easily occurs due to influences of the environment. An exception that occurs in a system bus in the communication chip is a common soft failure. The communication chip may include multiple devices such as a processor and an accelerator, the system bus is a communication channel between devices, and the devices communicate with each other and ensure data consistency through the system bus. Therefore, the robustness of the system bus is very important. It is one of the important manners for ensuring the robustness of the system bus to detect the exception that occurs in the system bus in the communication chip in time. However, at present, there is no method for finding the exception that occurs in the system bus in the communication chip in time.

SUMMARY OF THE INVENTION

For an exception that occurs in a system bus in time, embodiments of the present invention provide a method and apparatuses for monitoring a system bus. The technical solutions are as follows.

A method for monitoring a system bus includes:

performing, by a monitoring apparatus, real-time monitoring on a system bus corresponding to the monitoring apparatus, and when detecting that a command is transmitted through the system bus, obtaining command information of the command, where the command information includes a command identifier, a command address, and a data amount;

determining, according to the command identifier and command address, whether a command transmission exception occurs in the system bus;

if no command transmission exception occurs in the system bus, when detecting that data corresponding to the command is transmitted through the system bus, determining, according to the data and the data amount of the command information, whether a command exception occurs in the system bus; and when detecting that a response message corresponding to the command is transmitted through the system bus, obtaining a command wait time of the command, and determining, according to the command wait time, whether a timeout exception occurs in the system bus.

A method for monitoring a system bus includes:

when a monitoring apparatus monitors a system bus corresponding to the monitoring apparatus and detects that an exception occurs in the system bus, receiving the exception that occurs in the system bus and an identifier of the system bus that are sent by the monitoring apparatus;

if the exception that occurs in the system bus is a timeout exception, sending, according to the identifier of the system bus, a switch message to a device that is connected to the system bus, so that the device sends and receives a command or data by using a backup system bus; and if the exception that occurs in the system bus is not a timeout exception, increasing the number of exception times of the system bus; and then the number of the exception times exceeds a preset threshold, sending, according to the identifier of the system bus, a switch message to the device that is connected to the system bus, so that the device sends and receives a command or data by using the backup system bus.

A monitoring apparatus includes:

a monitoring module, configured to perform real-time monitoring on a system bus corresponding to the monitoring apparatus, and when detecting that a command is transmitted through the system bus, obtain command information of the command, where the command information includes a command identifier, a command address, and a data amount;

a first determination module, configured to determine, according to the command identifier and command address, whether a command transmission exception occurs in the system bus;

a second determination module, configured to: if no command transmission exception occurs in the system bus, when it is detected that data corresponding to the command is transmitted through the system bus, determine, according to the data and the data amount of the command information, whether a command exception occurs in the system bus; and a third determination module, configured to: if no command transmission exception occurs in the system bus, when it is detected that a response message corresponding to the command is transmitted through the system bus, obtain a command wait time of the command, and determine, according to the command wait time, whether a timeout exception occurs in the system bus.

A management apparatus includes:

a receiving module, configured to: when a monitoring apparatus monitors a system bus corresponding to the monitoring apparatus and detects that an exception occurs in the system bus, receive the exception that occurs in the system bus and an identifier of the system bus that are sent by the monitoring apparatus;

a first sending module, configured to: if the exception that occurs in the system bus is a timeout exception, send, according to the identifier of the system bus, a switch message to a device that is connected to the system bus, so that the device sends and receives a command or data by using a backup system bus; and a second sending module, configured to: if the exception that occurs in the system bus is not a timeout exception, increase the number of exception times of the system bus; and when the number of the exception times exceeds a preset threshold, send, according to the identifier of the system bus, a switch message to the device that is connected to the system bus, so that the device sends and receives a command or data by using the backup system bus.

In the embodiments of the present invention, the monitoring apparatus performs real-time monitoring on the system bus corresponding to the monitoring apparatus, when detecting that the command is transmitted through the system bus, obtains the command information of the command, where the command information includes the command identifier, the command address, and the data amount, and determines, according to the obtained command information, the data corresponding to the command and transmitted on the system bus, and the response message, whether an exception occurs in the system bus. In this way, the exception that occurs in the system bus can be found in time.

DETAILED DESCRIPTION OF THE EMBODIMENTS

To make the objectives, technical solutions, and advantages of the present invention more comprehensible, the following further describes the embodiments of the present invention in detail with reference to the accompanying drawings.

Figure 1:
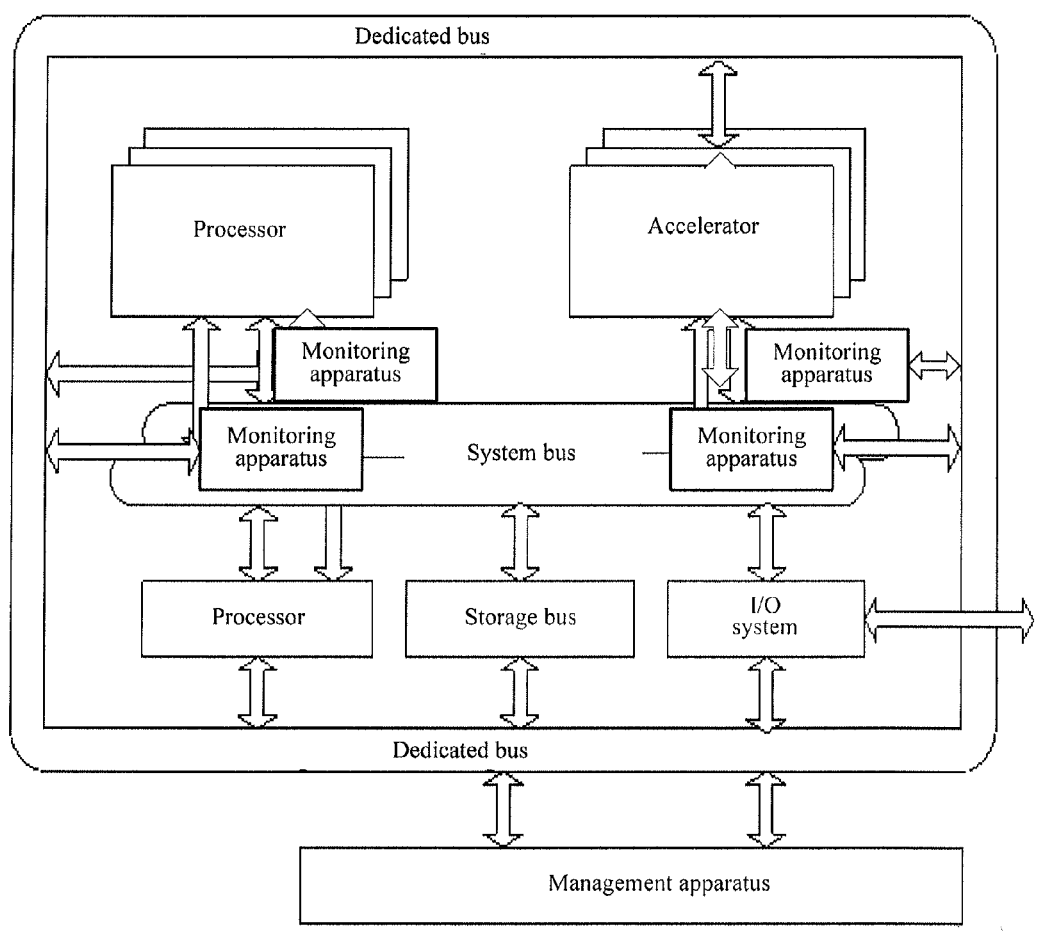
FIG. 1 is a schematic structural diagram of a communication chip provided by an embodiment of the present invention.

Referring to. FIG. 1, a communication chip includes devices such as processors, an accelerator, and a storage system. The devices are connected to each other through a system bus, and each device is connected to the system bus through a bus interface corresponding to each device. A monitoring apparatus is set at the bus interface, and the monitoring apparatus is corresponding to the system bus connected to the bus interface and corresponding to a device, where the bus interface is corresponding to the device. In the present invention, the system bus between the devices is in a dual-bus structure, namely, the system bus between the devices includes two system buses, the devices send and receive a command or data by using one of the system buses, and use the other system bus as a backup system bus. The command includes a command identifier, a command transmission type, a command address, and a data amount, the command is classified into a read command and a write command, where the command transmission type of a read command is a data reading type, while the command transmission type of a write command is a data writing type, and a command period of the command includes three transmission stages, which are a command stage, a data stage, and a response stage.

In the embodiment of the present invention, a device that sends a command is referred to as a main device, while a device that receives the command is referred to as a destination device. When the main device needs to read data from the destination device, the main device sends a read command to the system bus through a bus interface corresponding to the main device at the command stage, where the read command includes a command identifier, a command transmission type that is a data reading type, a command address, and the data amount that is the amount of read data, and the read command is transmitted through the system bus. The destination device receives the read command from the system bus through a bus interface corresponding to the destination device, reads data according to the amount of the read data included in the read command, and sends the data and the command identifier of the read command to the system bus through the bus interface corresponding to the destination device at the data stage, where the command identifier of the read command and the data are transmitted through the system bus. The main device receives the command identifier of the read command and the data from the system bus through the bus interface corresponding to the main device. Then, the destination device sends a response message to the system bus through the bus interface corresponding to the destination device at the response stage, where the response message carries a response identifier, and the response message is transmitted through the system bus. Finally, the main device receives the response message from the system bus through the bus interface corresponding to the main device.

When the main device needs to write data to the destination device, the main device sends a write command to the system bus through the bus interface corresponding to the main device at the command stage, where the write command includes a command identifier, a command transmission type that is a data writing type, a command address, and the data amount that is the amount of write data, and the write command is transmitted through the system bus. The destination device receives the write command from the system bus through the bus interface corresponding to the destination device. The main device sends data that needs to be written and the command identifier of the write command to the system bus through the bus interface corresponding to the main device at the data stage, where the command identifier of the write command and the data are transmitted through the system bus. The destination device receives the command identifier of the command and the data from the system bus through the bus interface corresponding to the destination device. Then, the destination device sends a response message to the system bus through the bus interface corresponding to the destination device at the response stage, where the response message carries a response identifier, and the response message is transmitted through the system bus. Finally, the main device receives the response message from the system bus through the bus interface corresponding to the main device.

In the present invention, a management apparatus is further included. The management apparatus is connected to each monitoring apparatus through a dedicated bus, each monitoring apparatus may report an exception that occurs in a system bus corresponding to each monitoring apparatus to the management apparatus through a dedicated bus, and the management apparatus receives the exception that occurs in the system bus, and processes the system bus.

In this embodiment, a monitoring apparatus corresponding to the main device and a monitoring apparatus corresponding to the destination device may perform real-time monitoring on a command and data that are transmitted on the system bus.

Figure 2:
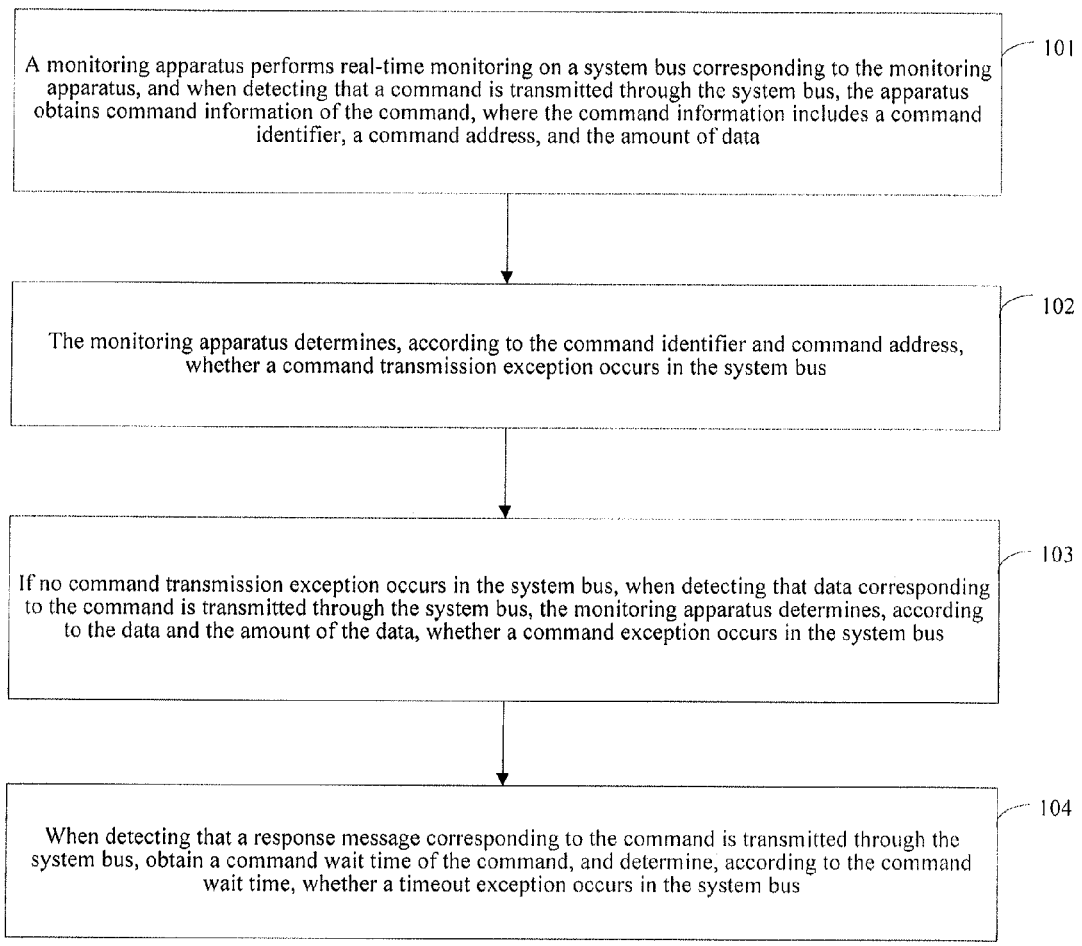
FIG. 2 is a flow chart of a method for monitoring a system bus provided by an embodiment of the present invention.
Figure 3A:
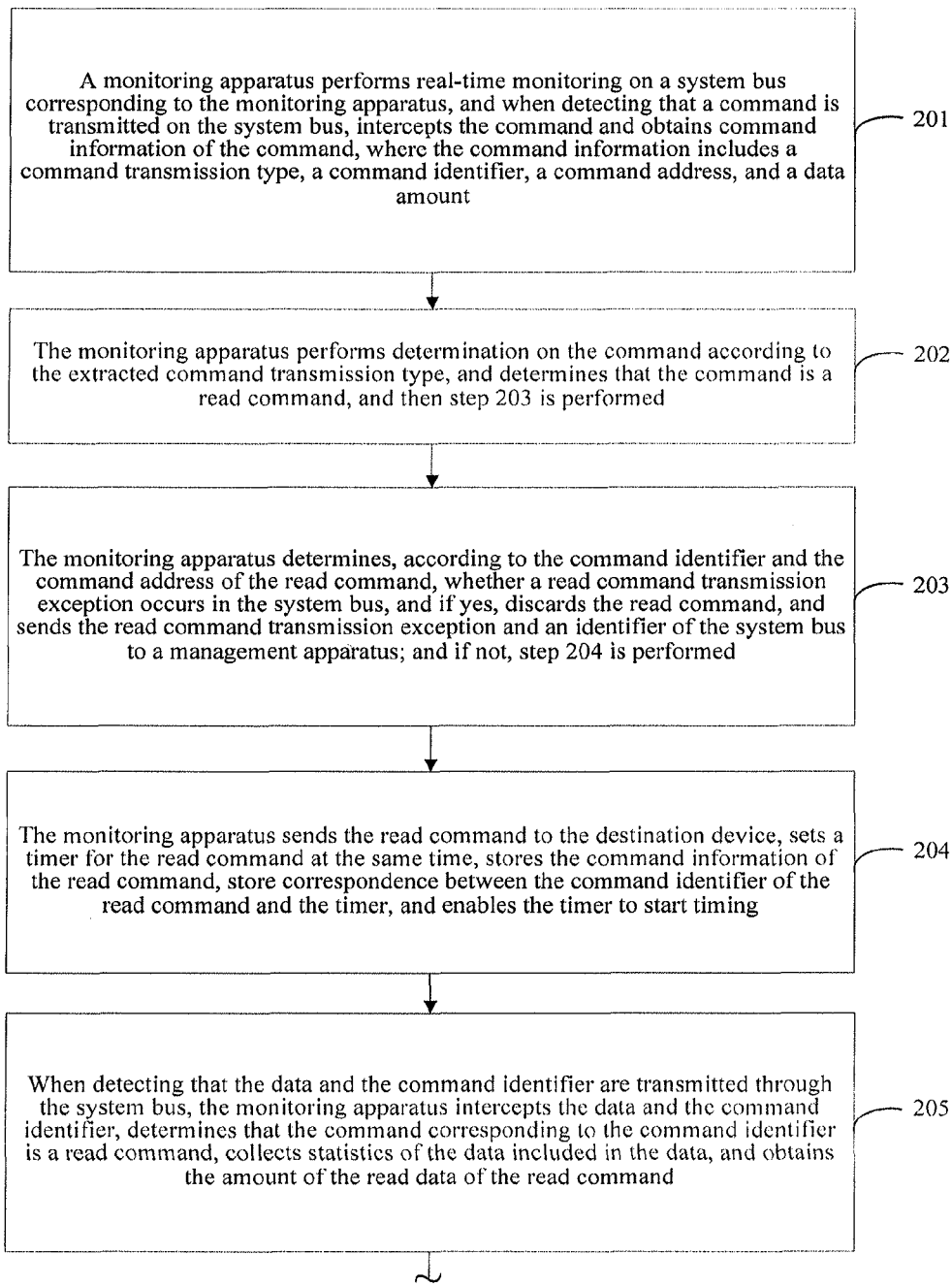
FIG. 3A to FIG. 3D are flow charts of a method for monitoring a system bus provided by another embodiment of the present invention.
Figure 3B:
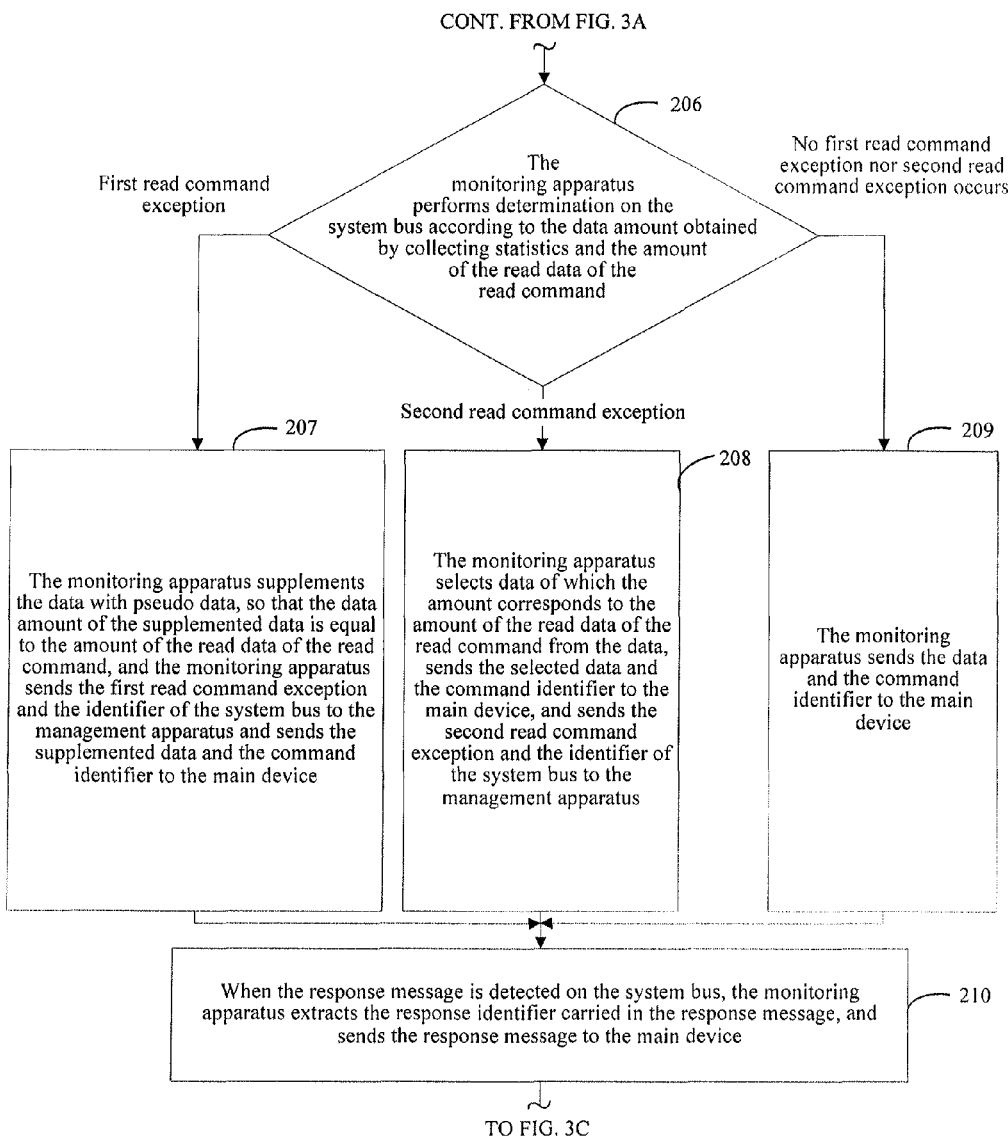
Figure 3C:
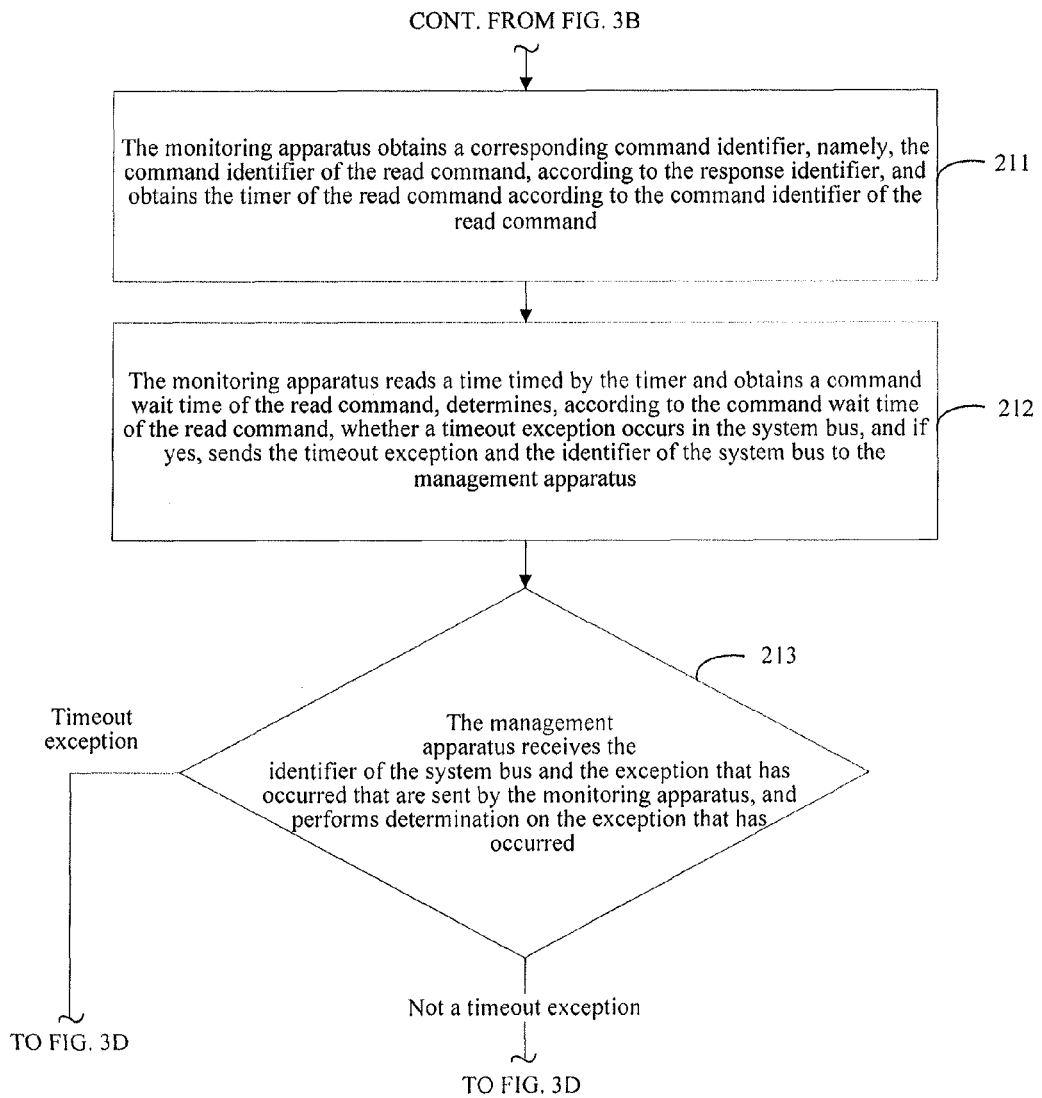
Figure 3D:
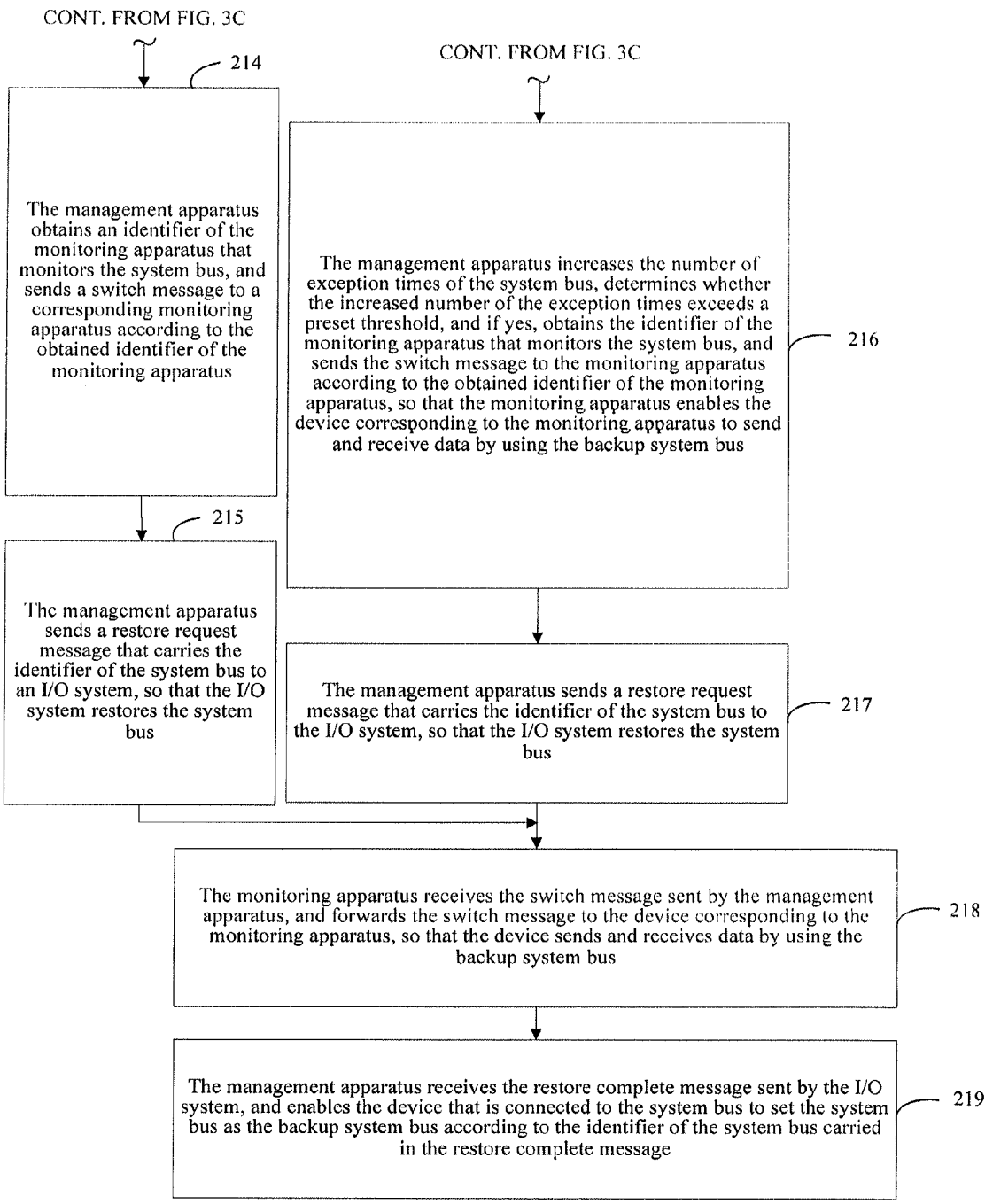
Figure 4A:
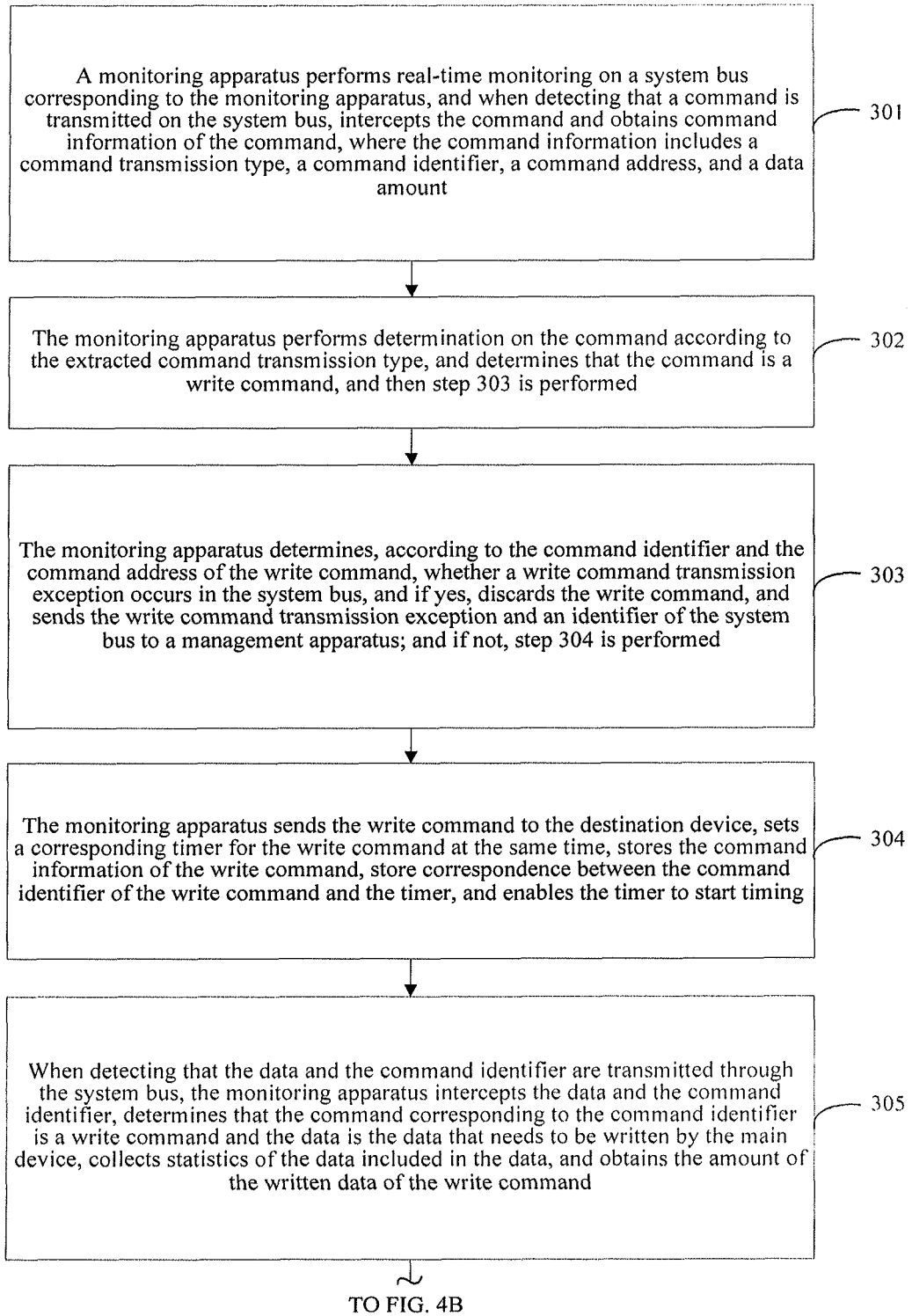
FIG. 4A to FIG. 4D are flow charts of a method for monitoring a system bus provided by another embodiment of the present invention.
Figure 4B:
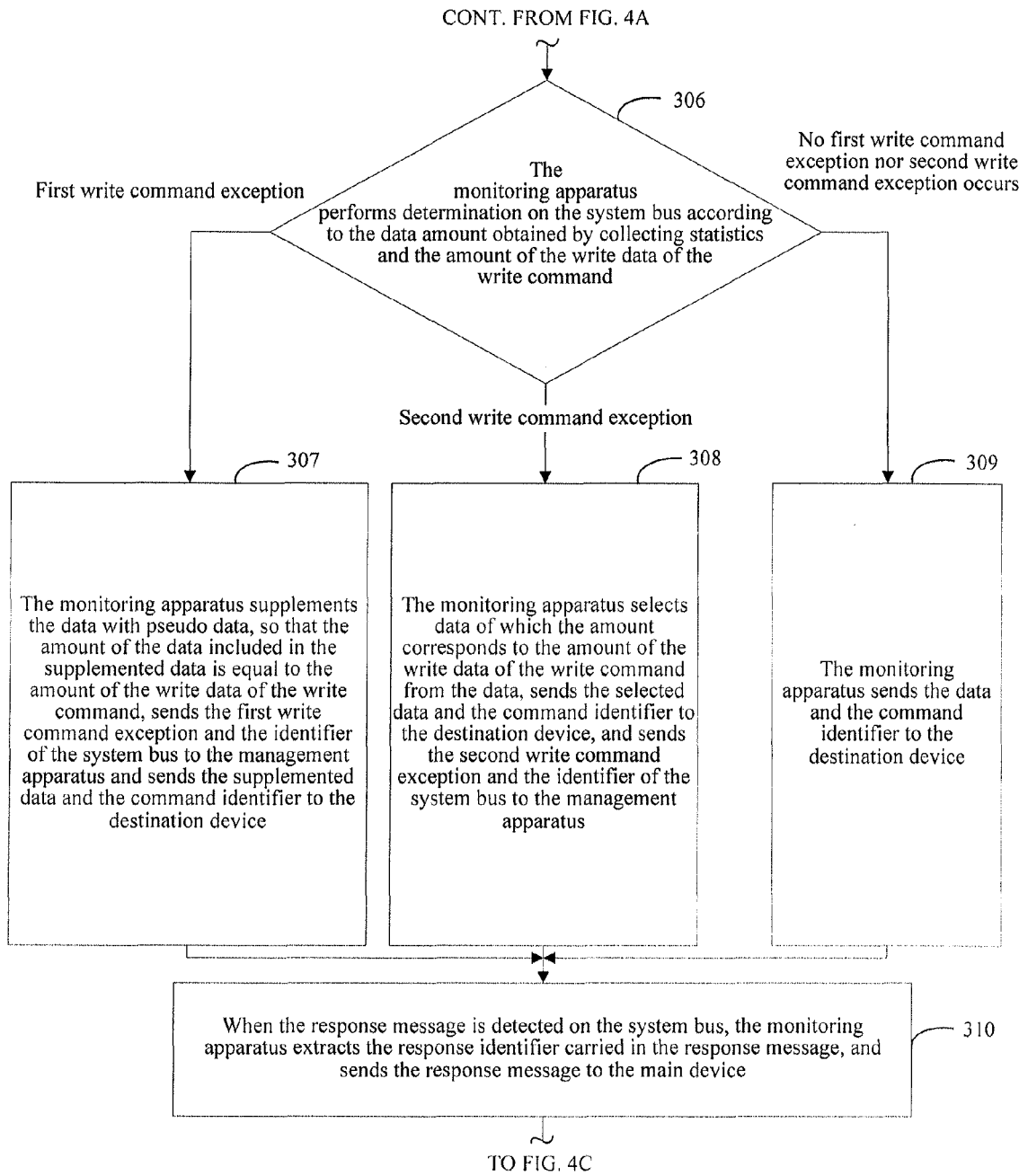
Figure 4C:
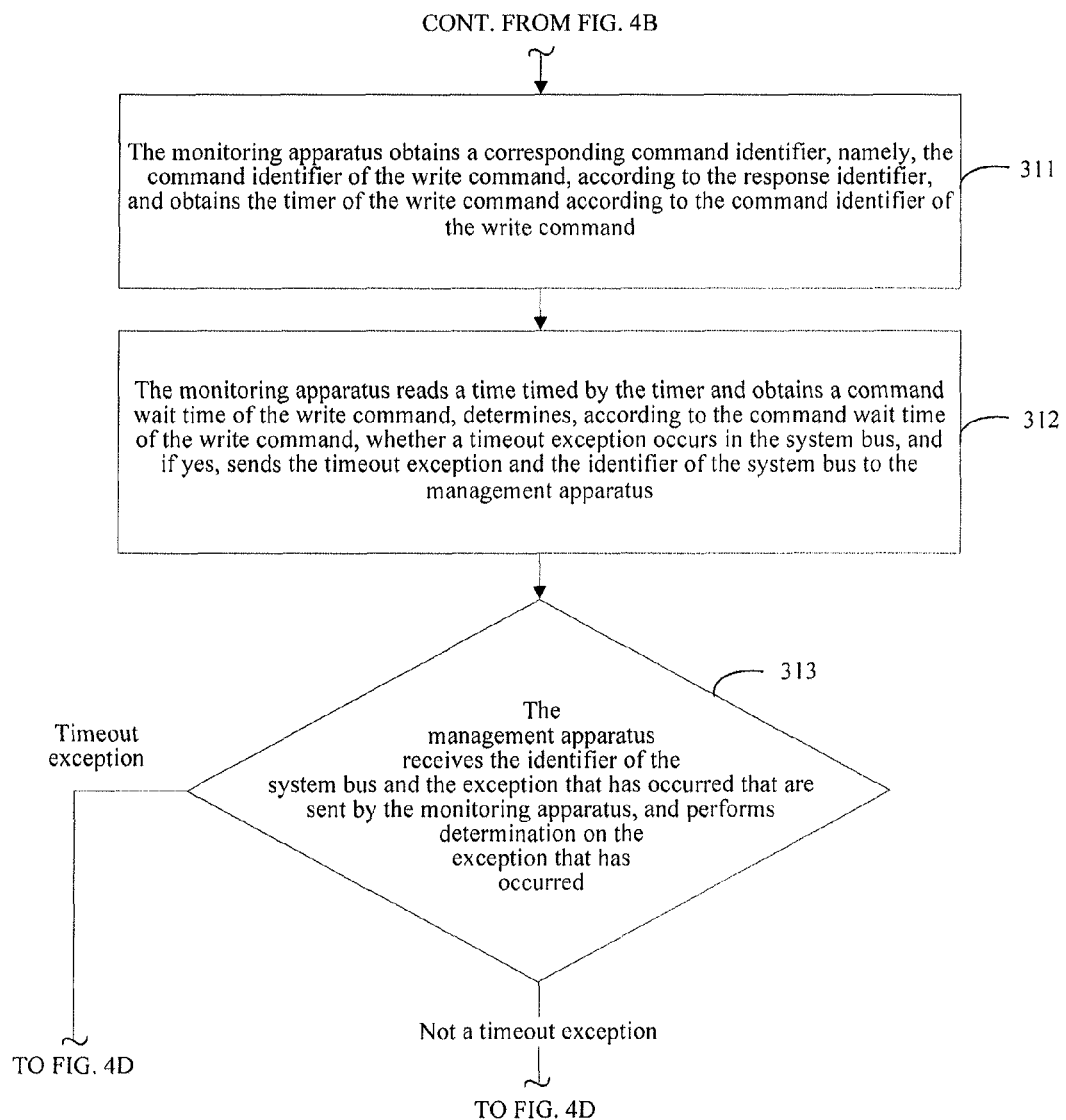
Figure 4D:
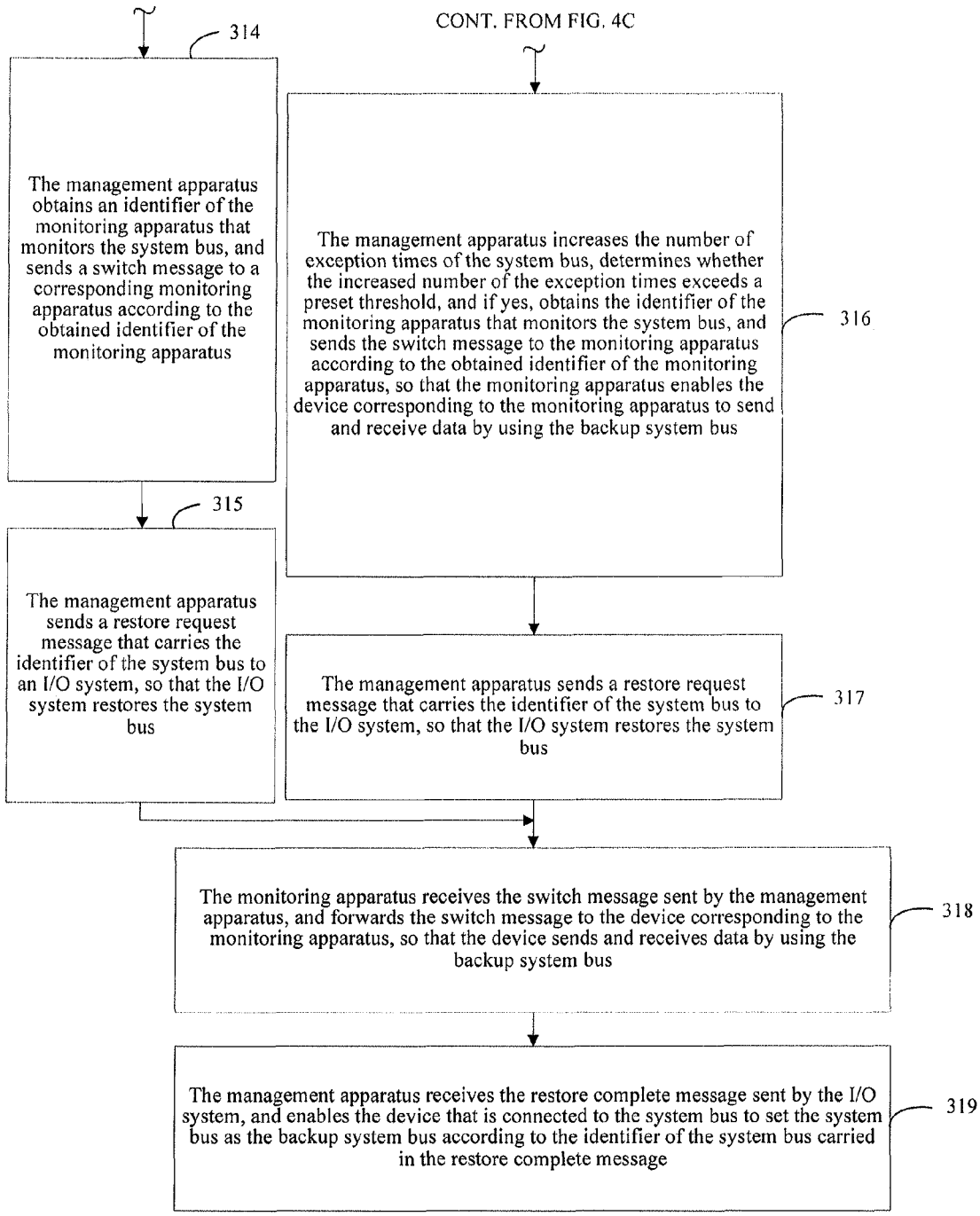

As shown in FIG. 2, an embodiment of the present invention provides a method for monitoring a system bus, which includes the following steps:

Step 101: A monitoring apparatus performs real-time monitoring on a system bus corresponding to the monitoring apparatus, and when detecting that a command is transmitted through the system bus, the apparatus obtains command information of the command, where the command information includes a command identifier, a command address, and a data amount.

Step 102: The monitoring apparatus determines, according to the command identifier and command address, whether a command transmission exception occurs in the system bus.

Step 103: If no command transmission exception occurs in the system bus, and when the monitoring apparatus detects that data corresponding to the command is transmitted through the system bus, the monitoring apparatus determines, according to the data and the data amount of the command information, whether a command exception occurs in the system bus.

Step 104: When detecting that a response message corresponding to the command is transmitted through the system bus, obtain a command wait time of the command, and determine, according to the command wait time, whether a timeout exception occurs in the system bus.

In the embodiment of the present invention, the monitoring apparatus performs real-time monitoring on the system bus corresponding to the monitoring apparatus, when detecting that the command is transmitted through the system bus, obtains the command information of the command, where the command information includes the command identifier, the command address, and the data amount, and determines, according to the obtained command information, the data corresponding to the command and transmitted on the system bus, and the response message, whether an exception occurs in the system bus. In this way, the exception that occurs in the system bus can be detected in time.

An embodiment of the present invention provides a method for monitoring a system bus. In this embodiment, a main device needs to read data from a destination device, and send a read command to the destination device through a system bus connected to the main device, and the destination device receives the read command, and reads data and sends the data to the main device through the system bus. A monitoring apparatus corresponding to the main device and/or a monitoring apparatus corresponding to the destination device may perform real-time monitoring on a command and data that are transmitted on the system bus by using the method of this embodiment. Referring to FIG. 3A to FIG. 3D, the method includes the following steps:

Step 201: A monitoring apparatus performs real-time monitoring on a system bus corresponding to the monitoring apparatus, and when detecting that a command is transmitted on the system bus, intercepts the command and obtains command information of the command, where the command information includes a command transmission type, a command identifier, a command address, and a data amount.

In this embodiment, the monitoring apparatus may be the monitoring apparatus corresponding to the main device and/or the monitoring apparatus corresponding to the destination device; the command sent by the main device is a read command; and the main device sends the read command to the system bus connected to the main device through a bus interface corresponding to the main device at the command stage, where the read command is transmitted through the system bus.

The monitoring apparatus may perform real-time monitoring on the system bus corresponding to the monitoring apparatus through a bus interface corresponding to the monitoring apparatus, when detecting that the command is transmitted on the system bus, the monitoring apparatus intercepts the command through the bus interface, and then extracts, from the command, the command transmission type, the command address, the command identifier, and the data amount.

In this step, the command transmitted on the system bus is the read command sent by the main device, so the monitoring apparatus intercepts, from the system bus, the command that is the read command, and extracts, from the command, the command transmission type that is a data reading type, the command address, the command identifier, and the data amount that is the amount of read data. In addition, the amount of the read data included in the read command is the amount of data that needs to be read by the main device from the destination device.

Step 202: The monitoring apparatus performs determination on the command according to the extracted command transmission type, and determines that the command is a read command, and then step 203 is performed.

Specifically, the monitoring apparatus performs determination on the extracted command transmission type, determines that the extracted command transmission type is the data reading type, and determines accordingly that the command is a read command.

If the command transmission type of the command is a data writing type, it is determined that the command is a write command.

Step 203: The monitoring apparatus determines, according to the command identifier and the command address of the read command, whether a read command transmission exception occurs in the system bus, and if yes, discards the read command, and sends the read command transmission exception and an identifier of the system bus to a management apparatus; and if not, step 204 is performed.

The monitoring apparatus obtains a bus protocol corresponding to the system bus, determines whether a legal command identifier range defined by the bus protocol includes the command identifier of the read command and whether a legal command address range defined by the bus protocol includes the command address of the read command, and if the legal command identifier range defined by the bus protocol includes the command identifier of the read command and the legal command address range defined by the bus protocol includes the command address of the read command, the monitoring apparatus determines that no read command transmission exception occurs in the system bus; and if the legal command identifier range defined by the bus protocol does not include the command identifier of the read command and/or the legal command address range defined by the bus protocol does not include the command address of the read command, the monitoring apparatus determines that a read command transmission exception occurs in the system bus.

The monitoring apparatus may pre-store the bus protocol corresponding to the system bus corresponding to the monitoring apparatus and the identifier of the system bus corresponding to the monitoring apparatus.

Step 204: The monitoring apparatus sends the read command to the destination device, sets a timer for the read command at the same time, stores the command information of the read command, stores correspondence between the command identifier of the read command and the timer, and enables the timer to start timing.

In this step, if the monitoring apparatus is the monitoring apparatus corresponding to the main device, the monitoring apparatus sends the read command to the destination device through the system bus (a system bus connected to the main device), and the destination device receives the read command from the system bus through the bus interface corresponding to the destination device; and if the monitoring apparatus is the monitoring apparatus corresponding to the destination device, the monitoring apparatus directly sends the read command to the destination device through the bus interface (where the bus interface is also the bus interface corresponding to the destination device) corresponding to the monitoring apparatus, and the destination device receives the read command.

After receiving the read command, the destination device reads, at the data stage of the read command, the data that needs to be read by the main device according to the amount of the read data included in the read command, and sends the command identifier of the read command and the data to the system bus through the bus interface corresponding to the destination device, where the command identifier of the read command and the data are transmitted through the system bus.

Step 205: When detecting that the data and the command identifier are transmitted through the system bus, the monitoring apparatus intercepts the data and the command identifier, determines that the command corresponding to the command identifier is a read command, collects statistics of the data included in the data, and obtains the amount of the read data of the read command.

Specifically, the monitoring apparatus performs real-time monitoring on the system bus through the bus interface corresponding to the monitoring apparatus, and when detecting that the data and the command identifier are transmitted through the system bus, the monitoring apparatus intercepts the data and the command identifier, obtains command information that includes the command identifier from the stored command information according to the command identifier, determines that the command corresponding to the command identifier is a read command according to that the command transmission type included in the command information is the data reading type, extracts the amount of the read data of the read command from the command information, and collects statistics of the data included in the data.

Step 206: The monitoring apparatus performs determination on the system bus according to the data amount obtained by collecting statistics and the amount of the read data of the read command, and if a first read command exception occurs in the system bus, step 207 is performed, and if a second read command exception occurs in the system bus, step 208 is performed; otherwise, step 209 is performed.

Specifically, the monitoring apparatus compares the data amount obtained by collecting statistics with the amount of the read data of the read command, and if the data amount obtained by collecting statistics is smaller than the amount of the read data of the read command, determines that a first read command exception occurs in the system bus, and if the data amount obtained by collecting statistics is larger than the amount of the read data of the read command, determines that a second read command exception occurs in the system bus; and if the two are equal, determines that no first and second read command exception occurs in the system bus.

If the first read command exception or the second read command exception occurs in the system bus, the amount of the read data included in the read command may change when the read command is transmitted through the system bus, so that the amount of the data read by the destination device according to the amount of the data included in the read command is not consistent with the amount of the data that needs to be read by the main device, or the amount of the data included in the data may change when the data is transmitted through the system bus, so that the amount of the data included in the data is not consistent with the amount of the data that needs to be read by the main device.

Step 207: The monitoring apparatus supplements the data with pseudo data, so that the data amount of the supplemented data is equal to the amount of the read data of the read command, and the monitoring apparatus sends the first read command exception and the identifier of the system bus to the management apparatus and sends the supplemented data and the command identifier to the main device, and step 210 is performed.

Specifically, the monitoring apparatus calculates the data amount for supplementation according to the data amount obtained by collecting statistics and the amount of the read data of the read command, supplements pseudo data corresponding to the calculated amount before or behind the data, so that the amount of the data included in the supplemented data is equal to the amount of the read data of the read command, and the monitoring apparatus sends the first read command exception and the identifier of the system bus to the management apparatus, and sends the supplemented data and the command identifier to the main device.

The pseudo data may be data that is all 0 or data that is all 1. In this step, if the monitoring apparatus is the monitoring apparatus corresponding to the destination device, the monitoring apparatus sends the supplemented data and the command identifier to the main device through the system bus, and the main device receives the supplemented data and the command identifier from the system bus through the bus interface corresponding to the main device; and if the monitoring apparatus is the monitoring apparatus corresponding to the main device, the monitoring apparatus directly sends the supplemented data and the command identifier to the main device through the bus interface corresponding to the monitoring apparatus, and the main device receives the supplemented data and the command identifier.

Step 208: The monitoring apparatus selects data of which the amount corresponds to the amount of the read data of the read command from the data, sends the selected data and the command identifier to the main device, and sends the second read command exception and the identifier of the system bus to the management apparatus, and step 210 is performed.

Specifically, the monitoring apparatus backward selects the data of which the amount corresponds to the amount of the read data of the read command by starting from the first data included in the data, or frontward selects the data of which the amount corresponds to the amount of the read data of the read command by starting from the last data included in the data, discards data that is not selected, sends the selected data and the command identifier to the main device, and sends the second read command exception and the identifier of the system bus to the management apparatus.

In this step, if the monitoring apparatus is the monitoring apparatus corresponding to the destination device, the monitoring apparatus sends the selected data and the command identifier to the main device through the system bus, and the main device receives the selected data and the command identifier from the system bus through the bus interface corresponding to the main device; and if the monitoring apparatus is the monitoring apparatus corresponding to the main device, the monitoring apparatus directly sends the selected data and the command identifier to the main device through the bus interface corresponding to the monitoring apparatus, and the main device receives the selected data and the command identifier.

Step 209: The monitoring apparatus sends the data and the command identifier to the main device.

In this step, if the monitoring apparatus is the monitoring apparatus corresponding to the destination device, the monitoring apparatus sends the data and the command identifier to the main device through the system bus, and the main device receives the data and the command identifier from the system bus through the bus interface corresponding to the main device; and if the monitoring apparatus is the monitoring apparatus corresponding to the main device, the monitoring apparatus directly sends the data and the command identifier to the main device through the bus interface corresponding to the monitoring apparatus, and the main device receives the data and the command identifier.

After completing sending the data and the command identifier of the read command, the destination device sends a response message to the system bus through the bus interface corresponding to the destination device at the response stage of the read command, where the response message carries a response identifier.

Step 210: When the response message is detected on the system bus, the monitoring apparatus extracts the response identifier carried in the response message, and sends the response message to the main device.

In this step, if the monitoring apparatus is the monitoring apparatus corresponding to the destination device, the monitoring apparatus sends the response message to the main device through the system bus, and the main device receives the response message from the bus through the bus interface corresponding to the main device; and if the monitoring apparatus is the monitoring apparatus corresponding to the main device, the monitoring apparatus directly sends the response message to the main device through the bus interface corresponding to the monitoring apparatus, and the main device receives the response message.

Step 211: The monitoring apparatus obtains a corresponding command identifier, namely, the command identifier of the read command, according to the response identifier, and obtains the timer of the read command according to the command identifier of the read command.

Specifically, the monitoring apparatus obtains the corresponding command identifier from stored correspondence between the response identifier and the command identifier according to the response identifier, where the command identifier is the command identifier of the read command, and obtains the timer of the read command from correspondence between the command identifier and the timer according to the command identifier of the read command.

Step 212: The monitoring apparatus reads a time timed by the timer and obtains a command wait time of the read command, determines, according to the command wait time of the read command, whether a timeout exception occurs in the system bus, and if yes, sends the timeout exception and the identifier of the system bus to the management apparatus.

Specifically, the monitoring apparatus reads the time timed by the timer, where the read time is the command wait time of the read command, determines whether the command wait time of the read command exceeds a preset command deadline, and if the command wait time of the read command exceeds the preset command deadline, determines that a timeout exception occurs in the system bus and sends the timeout exception and the identifier of the system bus to the management apparatus; and if the command wait time of the read command does not exceed the preset command deadline, determines that no timeout exception occurs in the system bus.

After the monitoring apparatus determines whether a timeout exception occurs in the system bus, the monitoring apparatus continues to perform real-time monitoring on the system bus, and when it is detected that a command is transmitted on the system bus, the process is performed from the foregoing step 201.

Step 213: The management apparatus receives the identifier of the system bus and the exception that has occurred that are sent by the monitoring apparatus, and performs determination on the exception that has occurred, and if the exception is a timeout exception, step 214 is performed, and if the exception is not a timeout exception, step 216 is performed.

The monitoring apparatus may send the identifier of the system bus and the exception that has occurred on the management apparatus through the dedicated bus between the monitoring apparatus and the management apparatus.

Step 214: The management apparatus obtains an identifier of the monitoring apparatus that monitors the system bus, and sends a switch message to a corresponding monitoring apparatus according to the obtained identifier of the monitoring apparatus, so that the monitoring apparatus enables a device corresponding to the monitoring apparatus to send and receive a command or data by using a backup system bus.

The management apparatus pre-stores the identifier of the monitoring apparatus and the identifier of the system bus monitored by the monitoring apparatus in the correspondence between identifiers of monitoring apparatuses and identifiers of system buses. Correspondingly, the operation, performed by the management apparatus, of obtaining the identifier of the monitoring apparatus that monitors the system bus may specifically be: the management apparatus searches the stored correspondence between identifiers of monitoring apparatuses and identifiers of system buses for the corresponding identifier of the monitoring apparatus according to the identifier of the system bus, where the found identifier of the monitoring apparatus is the identifier of the monitoring apparatus that monitors the system bus.

The management apparatus may send the switch message to the monitoring apparatus through the dedicated bus between the management apparatus and the monitoring apparatus, and after the monitoring apparatus receives the switch message, the monitoring apparatus forwards the switch message to the device corresponding to the monitoring apparatus, and then the device receives the switch message, and sends and transmits a command or data by using the backup system bus.

Step 215: The management apparatus sends a restore request message that carries the identifier of the system bus to an I/O (Input/Output, input/output) system, so that the I/O system restores the system bus, and then step 218 is performed.

The I/O system receives the restore request message, restores the system bus according to the identifier of the system bus carried in the restore request message, and sends a restore complete message to the management apparatus after completing restoration, where the restore complete message carries the identifier of the system bus.

Furthermore, the management apparatus searches stored correspondence between the identifier of the system bus and the number of the exception times according to the identifier of the system bus, and if the corresponding number of the exception times (which is the number of the exception times of the exception that has occurred in the system bus) is found, sets the found number of the exception times to zero.

Step 216: The management apparatus increases the number of exception times of the system bus, determines whether the increased number of the exception times exceeds a preset threshold, and if yes, obtains the identifier of the monitoring apparatus that monitors the system bus, and sends the switch message to the monitoring apparatus according to the obtained identifier of the monitoring apparatus, so that the monitoring apparatus enables the device corresponding to the monitoring apparatus to send and receive data by using the backup system bus.

The management apparatus searches the stored correspondence between the identifier of the system bus and the number of the exception times according to the identifier of the system bus, if the corresponding number of the exception times is found, increases the found number of the exception times, so as to increase the number of the exception times of the system bus, and if the corresponding number of the exception times is not found, sets an initial value of the number of the exception times, and stores the identifier of the system bus and the set initial value in the correspondence between the identifier of the system bus and the number of the exception times, so as to increase the number of the exception times of the system bus, where the number of the exception times indicates the number of times exception happens in the system bus.

Step 217: The management apparatus sends a restore request message that carries the identifier of the system bus to the I/O system, so that the I/O system restores the system bus.

The I/O system receives the restore request message, restores the system bus according to the identifier of the system bus carried in the restore request message, and sends a restore complete message to the management apparatus after completing restoration, where the restore complete message carries the identifier of the system bus.

Step 218: The monitoring apparatus receives the switch message sent by the management apparatus, and forwards the switch message to the device corresponding to the monitoring apparatus, so that the device sends and receives data by using the backup system bus.

Step 219: The management apparatus receives the restore complete message sent by the I/O system, and enables the device that is connected to the system bus to set the system bus as the backup system bus according to the identifier of the system bus carried in the restore complete message.

Specifically, the management apparatus receives the restore complete message sent by the I/O system, obtains the corresponding identifier of the monitoring apparatus from stored correspondence between identifiers of system buses and identifiers of monitoring apparatuses according to the identifier of the system bus carried in the restore complete message, and sends the restore complete message to the corresponding monitoring apparatus through the dedicated bus according to the obtained identifier of the monitoring apparatus. The monitoring apparatus receives the restore complete message, and sends the restore complete message to the device corresponding to the monitoring apparatus. The device receives the restore complete message and sets the system bus corresponding to the identifier of the system bus carried in the restore complete message as the backup system bus.

In the embodiment of the present invention, the monitoring apparatus performs real-time monitoring on the system bus corresponding to the monitoring apparatus, and detects the exception that occurs in the system bus in time, and then reports the exception that has occurred and the identifier of the system bus to the management apparatus, and if the timeout exception occurs in the system bus or the number of the exception times of the bus exceeds the preset threshold, the management apparatus sends the switch message to the device that is connected to the system bus, so that the device sends and receives a command or data by using the backup system bus, thereby eliminating influences of the exception that occurs in the system bus on the device in normally sending and receiving a command or data, and meanwhile, the management apparatus requires the I/O system to restore the system bus, thereby eliminating the exception that occurs in the system bus.

An embodiment of the present invention provides a method for monitoring a system bus. In this embodiment, a main device needs to write data to a destination device, send a write command to the destination device through a system bus connected to the main device, and then sends data that needs to be written to the destination device through the system bus. A monitoring apparatus corresponding to the main device and/or a monitoring apparatus corresponding to the destination device may perform real-time monitoring on a command and data that are transmitted on the system bus by using the method of this embodiment. Referring to FIG. 4A to FIG. 4D, the method includes the following steps.

Step 301: A monitoring apparatus performs real-time monitoring on a system bus corresponding to the monitoring apparatus, and when detecting that a command is transmitted on the system bus, intercepts the command and obtains command information of the command, where the command information includes a command transmission type, a command identifier, a command address, and a data amount.

In this embodiment, the monitoring apparatus may be the monitoring apparatus corresponding to the main device and/or the monitoring apparatus corresponding to the destination device; the command sent by the main device is a write command; and the main device sends the write command to the system bus connected to the main device through a bus interface corresponding to the main device at a command stage, where the write command is transmitted through the system bus.

The monitoring apparatus may perform real-time monitoring on the system bus corresponding to the monitoring apparatus through a bus interface corresponding to the monitoring apparatus, and when detecting that the command is transmitted on the system bus, the monitoring apparatus intercepts the command through the bus interface, and then extracts, from the command, the command transmission type, the command address, the command identifier, and the data amount.

In this step, the command transmitted on the system bus is the write command sent by the main device, so the monitoring apparatus intercepts, from the system bus, the command that is the write command, and extracts, from the write command, the command transmission type that is a data writing type, the command address, the command identifier, and the data amount that is the amount of write data. In addition, the amount of the write data included in the write command is the amount of data that needs to be written by the main device to the destination device.

Step 302: The monitoring apparatus performs determination on the command according to the extracted command transmission type, and determines that the command is a write command, and then step 303 is performed.

Specifically, the monitoring apparatus performs determination on the extracted command transmission type, determines that the extracted command transmission type is the data writing type, and determines accordingly that the command is a write command.

If the command transmission type of the command is a data reading type, it is determined that the command is a read command.

Step 303: The monitoring apparatus determines, according to the command identifier and the command address of the write command, whether a write command transmission exception occurs in the system bus, and if yes, discards the write command, and sends the write command transmission exception and an identifier of the system bus to a management apparatus; and if not, step 304 is performed.

The monitoring apparatus obtains a bus protocol corresponding to the system bus, determines whether a legal command identifier range defined by the bus protocol includes the command identifier of the write command and whether a legal command address range defined by the bus protocol includes the command address of the write command, and if the legal command identifier range defined by the bus protocol includes the command identifier of the write command and the legal command address range defined by the bus protocol includes the command address of the write command, the monitoring apparatus determines that no write command transmission exception occurs in the system bus; and if the legal command identifier range defined by the bus protocol does not include the command identifier of the write command and/or the legal command address range defined by the bus protocol does not include the command address of the write command, the monitoring apparatus determines that a write command transmission exception occurs in the system bus.

Step 304: The monitoring apparatus sends the write command to the destination device, sets a corresponding timer for the write command at the same time, stores the command information of the write command, store correspondence between the command identifier of the write command and the timer, and enables the timer to start timing.

In this step, if the monitoring apparatus is the monitoring apparatus corresponding to the main device, the monitoring apparatus sends the write command to the destination device through the system bus (a system bus connected to the main device), and the destination device receives the write command from the bus through the bus interface corresponding to the destination device; and if the monitoring apparatus is the monitoring apparatus corresponding to the destination device, the monitoring apparatus directly sends the write command to the destination device through the bus interface (where the bus interface is also the bus interface corresponding to the destination device) corresponding to the monitoring apparatus, and the destination device receives the write command.

After sending the write command, the main device sends, a data stage of the write command, the command identifier of the write command and the needed data to the system bus through the bus interface corresponding to the main device at.

Step 305: When detecting that the data and the command identifier are transmitted through the system bus, the monitoring apparatus intercepts the data and the command identifier, determines that the command corresponding to the command identifier is a write command and the data is the data that needs to be written by the main device, collects statistics of the data included in the data, and obtains the amount of the write data of the write command.

Specifically, the monitoring apparatus performs real-time monitoring on the system bus through the bus interface corresponding to the monitoring apparatus, and when detecting that the data and the command identifier are transmitted through the system bus, the monitoring apparatus intercepts the data and the command identifier, obtains command information that includes the command identifier from the stored command information according to the command identifier, determines that the command corresponding to the command identifier is a write command according to that the command transmission type included in the command information is the data writing type, extracts the amount of the write data of the write command from the command information, and collects statistics of the data included in the data.

Step 306: The monitoring apparatus performs determination on the system bus according to the data amount obtained by collecting statistics and the amount of the write data of the write command, and if a first write command exception occurs in the system bus, step 307 is performed, and if a second write command exception occurs in the system bus, step 308 is performed; otherwise, step 309 is performed.

Specifically, the monitoring apparatus compares the data amount obtained by collecting statistics with the amount of the write data of the write command, and if the data amount obtained by collecting statistics is smaller than the amount of the write data of the write command, the monitoring apparatus determines that a first write command exception occurs in the system bus, and if the data amount obtained by collecting statistics is larger than the amount of the write data of the write command, determines that a second write command exception occurs in the system bus; and if the two are equal, the monitoring apparatus determines that no first write command exception nor second write command exception occurs in the system bus.

If the first write command exception or the second write command exception occurs in the system bus, the amount of the write data included in the write command may change when the write command is transmitted through the system bus, or the amount of the data included in the data may change when the data is transmitted through the system bus, so that the amount of the data included in the data is not consistent with the amount of the data that needs to be written by the main device.

Step 307: The monitoring apparatus supplements the data with pseudo data, so that the amount of the data included in the supplemented data is equal to the amount of the write data of the write command, sends the first write command exception and the identifier of the system bus to the management apparatus and sends the supplemented data and the command identifier to the destination device, and step 310 is performed.

Specifically, the monitoring apparatus calculates the data amount for supplementation according to the amount of the data obtained by collecting statistics and the amount of the write data of the write command, supplements pseudo data corresponding to the calculated number before or behind the data, so that the amount of the data included in the supplemented data is equal to the amount of the write data of the write command, sends the first write command exception and the identifier of the system bus to the management apparatus, and sends the supplemented data and the command identifier to the destination device.

The pseudo data may be data that is all 0 or data that is all 1. In this step, if the monitoring apparatus is the monitoring apparatus corresponding to the main device, the monitoring apparatus sends the supplemented data and the command identifier to the destination device through the system bus, and the destination device receives the supplemented data and the command identifier from the system bus through the bus interface corresponding to the destination device; and if the monitoring apparatus is the monitoring apparatus corresponding to the destination device, the monitoring apparatus directly sends the supplemented data and the command identifier to the destination device through the bus interface corresponding to the monitoring apparatus, and the destination device receives the supplemented data and the command identifier.

Step 308: The monitoring apparatus selects data of which the amount corresponds to the amount of the write data of the write command from the data, sends the selected data and the command identifier to the destination device, and sends the second write command exception and the identifier of the system bus to the management apparatus, and step 310 is performed.

Specifically, the monitoring apparatus backward selects the data of which the amount corresponds to the amount of the write data of the write command by starting from the first data included in the data, or frontward selects the data of which the amount corresponds to the amount of the write data of the write command by starting from the last data included in the data, discards data that is not selected, sends the selected data and the command identifier to the destination device, and sends the second write command exception and the identifier of the system bus to the management apparatus.

In this step, if the monitoring apparatus is the monitoring apparatus corresponding to the main device, the monitoring apparatus sends the selected data and the command identifier to the main device through the system bus, and the destination device receives the selected data and the command identifier from the bus through the bus interface corresponding to the destination device; and if the monitoring apparatus is the monitoring apparatus corresponding to the destination device, the monitoring apparatus directly sends the selected data and the command identifier to the destination device, and the destination device receives the selected data and the command identifier.

Step 309: The monitoring apparatus sends the data and the command identifier to the destination device.

In this step, if the monitoring apparatus is the monitoring apparatus corresponding to the main device, the monitoring apparatus sends the data and the command identifier to the destination device through the system bus, and the destination device receives the data and the command identifier from the bus through the bus interface corresponding to the destination device; and if the monitoring apparatus is the monitoring apparatus corresponding to the destination device, the monitoring apparatus directly sends the data and the command identifier to the destination device through the bus interface corresponding to the monitoring apparatus, and the destination device receives the data and the command identifier.

After completing receiving the data and the command identifier, the destination device sends a response message to the system bus through the bus interface corresponding to the destination device at a response stage of the write command corresponding to the command identifier, where the response message carries a response identifier.

Step 310: When the response message is detected on the system bus, the monitoring apparatus extracts the response identifier carried in the response message, and sends the response message to the main device.

In this step, if the monitoring apparatus is the monitoring apparatus corresponding to the destination device, the monitoring apparatus sends the response message to the main device through the system bus, and the main device receives the response message from the bus through the bus interface corresponding to the main device; and if the monitoring apparatus is the monitoring apparatus corresponding to the main device, the monitoring apparatus directly sends the response message to the main device through the bus interface corresponding to the monitoring apparatus, and the main device receives the response message.

Step 311: The monitoring apparatus obtains a corresponding command identifier, namely, the command identifier of the write command, according to the response identifier, and obtains the timer of the write command according to the command identifier of the write command.

Specifically, the monitoring apparatus obtains the corresponding command identifier from stored correspondence between the response identifier and the command identifier according to the response identifier, where the command identifier is the command identifier of the write command, and obtains the timer of the write command from correspondence between the command identifier and the timer according to the command identifier of the write command.

Step 312: The monitoring apparatus reads a time timed by the timer and obtains a command wait time of the write command, determines, according to the command wait time of the write command, whether a timeout exception occurs in the system bus, and if yes, sends the timeout exception and the identifier of the system bus to the management apparatus.

Specifically, the monitoring apparatus reads the time timed by the timer, where the read time is the command wait time of the write command, determines whether the command wait time of the write command exceeds a preset command deadline, and if the command wait time of the write command exceeds the preset command deadline, determines that a timeout exception occurs in the system bus and sends the timeout exception and the identifier of the system bus to the management apparatus; and if the command wait time of the write command does not exceed the preset command deadline, determines that no timeout exception occurs in the system bus.

After the monitoring apparatus determines whether a timeout exception occurs in the system bus, the monitoring apparatus continues to perform real-time monitoring on the system bus, and when it is detected that a command is transmitted on the system bus, the process is performed from the foregoing step 301.

Step 313: The management apparatus receives the identifier of the system bus and the exception that has occurred that are sent by the monitoring apparatus, and performs determination on the exception that has occurred, and if the exception is a timeout exception, step 314 is performed, and if the exception is not a timeout exception, step 316 is performed.

The monitoring apparatus may send the identifier of the system bus and the exception that has occurred on the management apparatus through a dedicated bus between the monitoring apparatus and the management apparatus.

Step 314: The management apparatus obtains an identifier of the monitoring apparatus that monitors the system bus, and sends a switch message to a corresponding monitoring apparatus according to the obtained identifier of the monitoring apparatus, so that the monitoring apparatus enables a device corresponding to the monitoring apparatus to send and receive data by using a backup system bus.

The management apparatus pre-stores the identifier of the monitoring apparatus and the identifier of the system bus monitored by the monitoring apparatus in the correspondence between the identifier of the monitoring apparatus and the identifier of the system bus. Correspondingly, the operation, performed by the management apparatus, of obtaining the identifier of the monitoring apparatus that monitors the system bus may specifically be: the management apparatus searches the stored correspondence between identifiers of monitoring apparatuses and identifier of system buses for the corresponding identifier of the monitoring apparatus according to the identifier of the system bus, where the found identifier of the monitoring apparatus is the identifier of the monitoring apparatus that monitors the system bus.

Step 315: The management apparatus sends a restore request message that carries the identifier of the system bus to an I/O system, so that the I/O system restores the system bus, and step 318 is performed.

The I/O system receives the restore request message, restores the system bus according to the identifier of the system bus carried in the restore request message, and sends a restore complete message to the management apparatus after completing restoration, where the restore complete message carries the identifier of the system bus.

Furthermore, the management apparatus searches stored correspondence between the identifier of the system bus and the number of the exception times according to the identifier of the system bus, and if the corresponding number of the exception times (which is the number of the exception times of the exception that has occurred in the system bus) is found, sets the found number of the exception times to zero.

Step 316: The management apparatus increases the number of exception times of the system bus, determines whether the increased number of the exception times exceeds a preset threshold, and if yes, obtains the identifier of the monitoring apparatus that monitors the system bus, and sends the switch message to the monitoring apparatus according to the obtained identifier of the monitoring apparatus, so that the monitoring apparatus enables the device corresponding to the monitoring apparatus to send and receive data by using the backup system bus.

The management apparatus searches the stored correspondence between the identifier of the system bus and the number of the exception times according to the identifier of the system bus, if the corresponding number of the exception times is found, increases the found number of the exception times, so as to increase the number of the exception times of the system bus, and if the corresponding number of the exception times is not found, sets an initial value of the number of the exception times, and stores the identifier of the system bus and the set initial value in the correspondence between the identifier of the system bus and the number of the exception times, so as to increase the number of the exception times of the system bus.

Step 317: The management apparatus sends a restore request message that carries the identifier of the system bus to the I/O system, so that the I/O system restores the system bus.

The I/O system receives the restore request message, restores the system bus according to the identifier of the system bus carried in the restore request message, and sends a restore complete message to the management apparatus after completing restoration, where the restore complete message carries the identifier of the system bus.

Step 318: The monitoring apparatus receives the switch message sent by the management apparatus, and forwards the switch message to the device corresponding to the monitoring apparatus, so that the device sends and receives data by using the backup system bus.

Step 319: The management apparatus receives the restore complete message sent by the I/O system, and enables the device that is connected to the system bus to set the system bus as the backup system bus according to the identifier of the system bus carried in the restore complete message.

Specifically, the management apparatus receives the restore complete message sent by the I/O system, obtains the corresponding identifier of the monitoring apparatus from the stored correspondence between identifiers of the system buses and identifiers of monitoring apparatuses according to the identifier of the system bus carried in the restore complete message, and sends the restore complete message to the corresponding monitoring apparatus according to the obtained identifier of the monitoring apparatus. The monitoring apparatus receives the restore complete message, and sends the restore complete message to the device corresponding to the monitoring apparatus. The device receives the restore complete message and sets the system bus corresponding to the identifier of the system bus carried in the restore complete message as the backup system bus.

In the embodiment of the present invention, the monitoring apparatus performs real-time monitoring on the system bus corresponding to the monitoring apparatus, and detects the exception that occurs in the system bus in time, and then reports the exception that has occurred and the identifier of the system bus to the management apparatus, and if the timeout exception occurs in the system bus or the number of the exception times of the bus exceeds the preset threshold, the management apparatus sends the switch message to the device that is connected to the system bus, so that the device sends and receives a command or data by using the backup system bus, thereby eliminating influences of the exception that occurs in the system bus on the device in normally sending and receiving a command or data, and meanwhile, the management apparatus requires the I/O system to restore the system bus, thereby eliminating the exception that occurs in the system bus.

Figure 5:
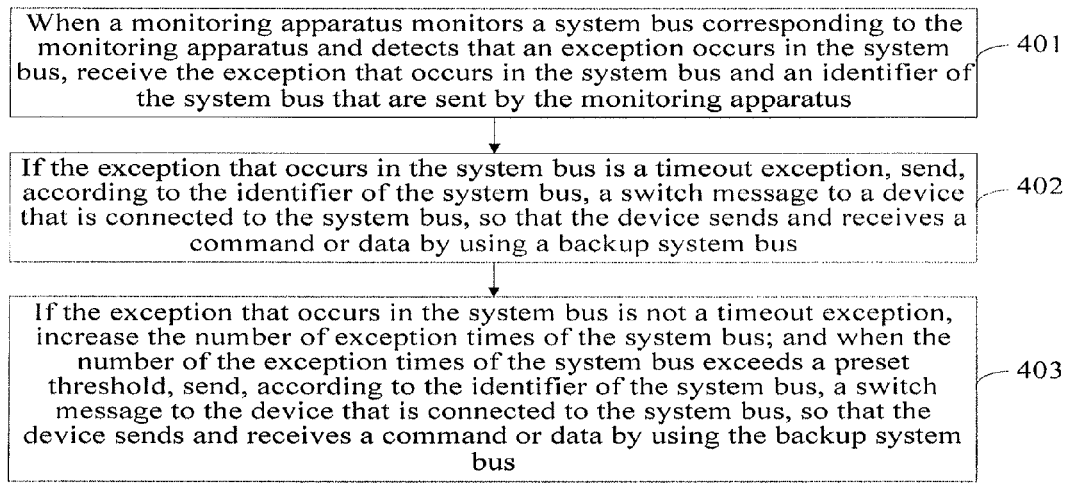
FIG. 5 is a flow chart of a method for monitoring a system bus provided by another embodiment of the present invention.

As shown in FIG. 5, an embodiment of the present invention provides a method for monitoring a system bus, which includes the following steps:

Step 401: When a monitoring apparatus monitors a system bus corresponding to the monitoring apparatus and detects that an exception occurs in the system bus, receive the exception that occurs in the system bus and an identifier of the system bus that are sent by the monitoring apparatus.

Step 402: If the exception that occurs in the system bus is a timeout exception, send, according to the identifier of the system bus, a switch message to a device that is connected to the system bus, so that the device sends and receives a command or data by using a backup system bus.

Step 403: If the exception that occurs in the system bus is not a timeout exception, increase the number of the exception times of the system bus; and when the number of the exception times of the system bus exceeds a preset threshold, send, according to the identifier of the system bus, a switch message to the device that is connected to the system bus, so that the device sends and receives a command or data by using the backup system bus.

In the embodiment of the present invention, the exception that occurs in the system bus and the identifier of the system bus that are sent by the monitoring apparatus are received; if the exception that occurs in the system bus is a timeout exception, the switch message is sent, according to the identifier of the system bus, to the device that is connected to the system bus, so that the device sends and receives a command or data by using the backup system bus; and if the exception that occurs in the system bus is not a timeout exception, the number of the exception times of the system bus is increased, and when the number of the exception times of the system bus exceeds the preset threshold, the switch message is sent, according to the identifier of the system bus, to the device that is connected to the system bus, so that the device sends and receives a command or data by using the backup system bus. In this way, when an exception occurs in the system bus, the device that is connected to the system bus sends and receives data by using the backup system bus, so as to ensure that the device can normally send and receive data.

Figure 6:
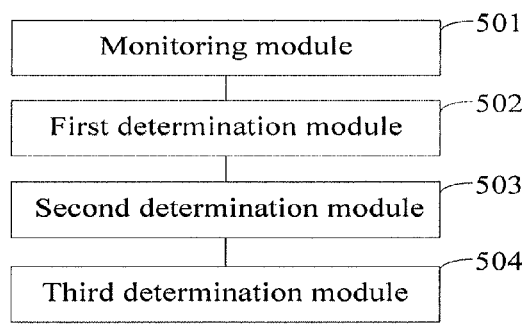
FIG. 6 is a schematic structural diagram of a monitoring apparatus provided by an embodiment of the present invention.

As shown in FIG. 6, an embodiment of the present invention provides a monitoring apparatus, which includes:

a monitoring module 501, configured to perform real-time monitoring on a system bus corresponding to the monitoring apparatus, and when detecting that a command is transmitted through the system bus, obtain command information of the command, where the command information includes a command identifier, a command address, and a data amount;

a first determination module 502, configured to determine, according to the command identifier and command address, whether a command transmission exception occurs in the system bus;

a second determination module 503, configured to: if no command transmission exception occurs in the system bus, when it is detected that data corresponding to the command is transmitted through the system bus, determine, according to the data and the data amount of the command information, whether a command exception occurs in the system bus; and a third determination module 504, configured to: if no command transmission exception occurs in the system bus, when it is detected that a response message corresponding to the command is transmitted through the system bus, obtain a command wait time of the command, and determine, according to the command wait time, whether a timeout exception occurs in the system bus.

The first determination module 502 includes:

a first obtaining unit, configured to obtain a bus protocol corresponding to the system bus, determine whether a legal command identifier range defined by the bus protocol includes the command identifier, and whether a legal command address range defined by the bus protocol includes the command address; and a first determination unit, configured to: if the legal command identifier range defined by the bus protocol does not include the command identifier and/or the legal command address range defined by the bus protocol does not include the command address, determine that a command transmission exception occurs in the system bus; otherwise, determine that no command transmission exception occurs in the system bus.

The command exception includes a first command exception or a second command exception, where the second determination module 503 includes:

a comparison unit, configured to collect statistics of the obtained data to obtain the data amount, and compare the obtained amount and the data amount of the command information;

a second determination unit, configured to: if the obtained amount is smaller than the data amount of the command information, determine that the first command exception occurs in the system bus; and a third determination unit, configured to: if the obtained amount is larger than the data amount of the command information, determine that the second command exception occurs in the system bus.

Furthermore, the second determination module 503 further includes:

a first sending unit, configured to: supplement the data with pseudo data, so that the amount of data included in the supplemented data is equal to the data amount of the command information; if the command is a read command, send the supplemented data to a main device, where the main device is a device that sends the command; and if the command is a write command, send the supplemented data to a destination device, where the destination device is a device that receives the command.

Furthermore, the second determination module 503 further includes:

a second sending unit, configured to select data of which the amount corresponds to the amount of the data from the data; if the command is a read command, send the selected data to a main device, where the main device is a device that sends the command; and if the command is a write command, send the selected data to a destination device, where the destination device is a device that receives the command.

Furthermore, the device further includes:

a setting module, configured to: when it is determined that no command transmission exception occurs in the system bus, set a corresponding timer for the command, and enable the timer to start timing.

The third determination module 504 includes:

a second obtaining unit, configured to obtain a time timed by the timer corresponding to the command, and use the timed time as the command wait time of the command; and a determination module, configured to determine whether the command wait time of the command exceeds a preset command deadline, if the command wait time of the command exceeds the preset command deadline, determine that a timeout exception occurs in the system bus, and if the command wait time of the command does not exceed the preset command deadline, determine that no timeout exception occurs in the system bus.

Furthermore, the device further includes:

a processing module, configured to: when it is determined that an exception occurs in the system bus, send the exception that occurs in the system bus and an identifier of the system bus to a management apparatus, so that the management apparatus processes the exception that occurs in the system bus; and a switch module, configured to: when the management apparatus sends a switch message after processing the system bus, receive the switch message and forward the switch message to a device corresponding to the monitoring apparatus, so that the device sends and receives a command or data by using a backup system bus.

In the embodiment of the present invention, the monitoring apparatus performs real-time monitoring on the system bus corresponding to the monitoring apparatus, when detecting that the command is transmitted through the system bus, obtains the command information of the command, where the command information includes the command identifier, the command address, and the amount of the data, and determines, according to the obtained command information, the data corresponding to the command and transmitted on the system bus, and the response message, whether an exception occurs in the system bus. In this way, the exception that occurs in the system bus can be found in time.

Figure 7:
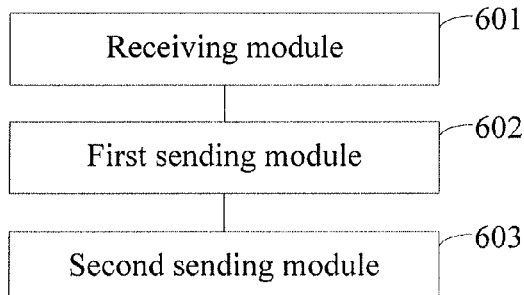
FIG. 7 is a schematic structural diagram of a management apparatus provided by an embodiment of the present invention.

As shown in FIG. 7, an embodiment of the present invention provides a management apparatus, which includes:

a receiving module 601, configured to: when a monitoring apparatus monitors a system bus corresponding to the monitoring apparatus and detects that an exception occurs in the system bus, receive the exception that occurs in the system bus and an identifier of the system bus that are sent by the monitoring apparatus;

a first sending module 602, configured to: if the exception that occurs in the system bus is a timeout exception, send, according to the identifier of the system bus, a switch message to a device that is connected to the system bus, so that the device sends and receives a command or data by using a backup system bus; and a second sending module 603, configured to: if the exception that occurs in the system bus is not a timeout exception, increase the number of exception times of the system bus; and when the number of the exception times exceeds a preset threshold, send, according to the identifier of the system bus, a switch message to the device that is connected to the system bus, so that the device sends and receives a command or data by using the backup system bus.

The first sending module 602 includes:

a first searching unit, configured to search stored correspondence between identifiers of system buses and identifiers of monitoring apparatuses for a corresponding identifier of a monitoring apparatus according to the identifier of the system bus; and a first sending unit, configured to send the switch message to a corresponding monitoring apparatus according to the identifier of the monitoring apparatus, so that the monitoring apparatus forwards the switch message to a device corresponding to the monitoring apparatus.

The second sending module 603 includes:

an increasing unit, configured to search stored correspondence between the identifier of the system bus and the number of the exception times according to the identifier of the system bus, if a corresponding number of the exception times is found, increase the found number of the exception times, and if a corresponding number of the exception times is not found, set an initial value of the number of the exception times, and store correspondence between the identifier of the system bus and the initial value of the number of the exception times; and a switch unit, configured to: when the number of the exception times exceeds a preset threshold, send, according to the identifier of the system bus, a switch message to a device that is connected to the system bus, so that the device sends and receives a command or data by using a backup system bus.

Furthermore, the device further includes:

a restore module, configured to send a restore request message that carries the identifier of the system bus to an input/output system, so that the input/output system restores the system bus.

In the embodiment of the present invention, the exception that occurs in the system bus and the identifier of the system bus that are sent by the monitoring apparatus are received; if the exception that occurs in the system bus is a timeout exception, the switch message is sent, according to the identifier of the system bus, to the device that is connected to the system bus, so that the device sends and receives a command or data by using the backup system bus; and if the exception that occurs in the system bus is not a timeout exception, the number of the exception times of the system bus is increased, and when the number of the exception times of the system bus exceeds the preset threshold, the switch message is sent, according to the identifier of the system bus, to the device that is connected to the system bus, so that the device sends and receives a command or data by using the backup system bus. In this way, when an exception occurs in the system bus, the device that is connected to the system bus sends and receives data by using the backup system bus, so as to ensure that the device can normally send and receive data.

Persons of ordinary skill in the art may understand that all or a part of the steps of the foregoing embodiments may be implemented through hardware, or may be implemented by a program instructing relevant hardware. The program may be stored in a computer readable storage medium. The storage medium may be a read-only memory, a magnetic disk, or an optical disk.

The foregoing descriptions are merely exemplary embodiments of the present invention, but are not intended to limit the present invention. Any modification, equivalent replacement, or improvement derived within the spirit and principle of the present invention shall fall within the protection scope of the present invention.

What is claimed is:

1. A method for monitoring a system bus, comprising:
performing, by a monitoring apparatus, real-time monitoring on a system bus corresponding to the monitoring apparatus, and when detecting that a command is transmitted through the system bus, obtaining command information of the command, wherein the command information comprises a command identifier, a command address, and a data amount;
determining, according to the command identifier and command address, whether a command transmission exception occurs in the system bus;
if no command transmission exception occurs in the system bus, and when detecting that data corresponding to the command is transmitted through the system bus,
collecting statistics of the data transmitted through the system bus to obtain the data amount,
determining whether a command exception occurs in the system bus by comparing the obtained amount and the data amount of the command information:
if the obtained amount is smaller than the data amount of the command information, determining that the first command exception occurs in the system bus; and
if the obtained amount is larger than the data amount of the command information, determining that the second command exception occurs in the system bus; and
when detecting that a response message corresponding to the command is transmitted through the system bus, obtaining a command wait time of the command, and determining, according to the command wait time, whether a timeout exception occurs in the system bus.

2. The method according to the claim 1, wherein the determining, according to the command identifier and command address, whether a command transmission exception occurs in the system bus comprises:
obtaining a bus protocol corresponding to the system bus, determining whether a legal command identifier range defined by the bus protocol comprises the command identifier, and whether a legal command address range defined by the bus protocol comprises the command address; and
if the legal command identifier range defined by the bus protocol does not comprise the command identifier, or the legal command address range defined by the bus protocol does not comprise the command address, determining that a command transmission exception occurs in the system bus; if the legal command identifier range defined by the bus protocol comprises the command identifier, and the legal command address range defined by the bus protocol comprises the command address, determining that no command transmission exception occurs in the system bus.

3. The method according to claim 1, wherein after the determining that the first command exception occurs in the system bus, the method further comprises:
supplementing the data with pseudo data, so that the data amount comprised in the supplemented data is equal to the data amount of the command information; if the command is a read command, sending the supplemented data to a main device, wherein the main device is a device that sends the command; and if the command is a write command, sending the supplemented data to a destination device, wherein the destination device is a device that receives the command.

4. The method according to claim 1, wherein after the determining that the second command exception occurs in the system bus, the method further comprises:
selecting data of which the amount corresponds to the data amount from the data; if the command is a read command, sending the selected data to a main device, wherein the main device is a device that sends the command; and if the command is a write command, sending the selected data to a destination device, wherein the destination device is a device that receives the command.

5. The method according to claim 1, further comprising:
when determining that no command transmission exception occurs in the system bus, setting a corresponding timer for the command, and enabling the timer to start timing.

6. The method according to claim 5, wherein the obtaining a command wait time of the command, and determining, according to the command wait time, whether a timeout exception occurs in the system bus comprises:
obtaining a time timed by the timer corresponding to the command, and using the timed time as the command wait time of the command; and
determining whether the command wait time of the command exceeds a preset command deadline, if the command wait time of the command exceeds the preset command deadline, determining that a timeout exception occurs in the system bus, and if the command wait time of the command does not exceed the preset command deadline, determining that no timeout exception occurs in the system bus.

7. The method according to claim 1, further comprising:
when determining that an exception occurs in the system bus, sending the exception that occurs in the system bus and an identifier of the system bus to a management apparatus, so that the management apparatus processes the exception that occurs in the system bus; and
when the management apparatus sends a switch message after processing the system bus, receiving the switch message and forwarding the switch message to a device corresponding to the monitoring apparatus, so that the device sends and receives a command or data by using a backup system bus.

8. A monitoring apparatus, comprising at least a processor which executes program codes stores in a memory, which configure the monitoring apparatus to:
perform real-time monitoring on a system bus corresponding to the monitoring apparatus, and when detecting that a command is transmitted through the system bus, obtain command information of the command, wherein the command information comprises a command identifier, a command address, and a data amount;
determine, according to the command identifier and command address, whether a command transmission exception occurs in the system bus;
if no command transmission exception occurs in the system bus, and when it is detected that data corresponding to the command is transmitted through the system bus, collect statistics of the data transmitted through the system bus to obtain the data amount;
determine, whether a command exception occurs in the system bus by comparing the obtained amount and the data amount of the command information:
if the obtained amount is smaller than the data amount of the command information, determining that the first command exception occurs in the system bus; and
if the obtained amount is larger than the data amount of the command information, determining that the second command exception occurs in the system bus; and
if no command transmission exception occurs in the system bus, and when it is detected that a response message corresponding to the command is transmitted through the system bus, obtain a command wait time of the command, and determine, according to the command wait time, whether a timeout exception occurs in the system bus.

9. The monitoring apparatus according to claim 8, is further configured to:
obtain a bus protocol corresponding to the system bus, determine whether a legal command identifier range defined by the bus protocol comprises the command identifier, and whether a legal command address range defined by the bus protocol comprises the command address; and
if the legal command identifier range defined by the bus protocol does not comprise the command identifier and/or the legal command address range defined by the bus protocol does not comprise the command address, determine that a command transmission exception occurs in the system bus; otherwise, determine that no command transmission exception occurs in the system bus.

10. The monitoring apparatus according to claim 8, further configured to:
supplement the data with pseudo data, so that the data amount comprised in the supplemented data is equal to the data amount of the command information; if the command is a read command, send the supplemented data to a main device, wherein the main device is a device that sends the command; and if the command is a write command, send the supplemented data to a destination device, wherein the destination device is a device that receives the command.

11. The monitoring apparatus according to claim 8, further configured to:
select data of which the amount corresponds to the data amount from the data; if the command is a read command, send the selected data to a main device, wherein the main device is a device that sends the command; and if the command is a write command, send the selected data to a destination device, wherein the destination device is a device that receives the command.

12. The monitoring apparatus according to claim 8, further configured to:
a setting module, configured to: when it is determined that no command transmission exception occurs in the system bus, set a corresponding timer for the command, and enable the timer to start timing.

13. The monitoring apparatus according to claim 12, further configured to:
obtain a time timed by the timer corresponding to the command, and use the timed time as the command wait time of the command; and
determine whether the command wait time of the command exceeds a preset command deadline; if the command wait time of the command exceeds the preset command deadline, determine that a timeout exception occurs in the system bus, and if the command wait time of the command does not exceed the preset command deadline, determine that no timeout exception occurs in the system bus.

14. The monitoring apparatus according to claim 8, further configured to:
when it is determined that an exception occurs in the system bus, send the exception that occurs in the system bus and an identifier of the system bus to a management apparatus, so that the management apparatus processes the exception that occurs in the system bus; and
when the management apparatus sends a switch message after processing the system bus, receive the switch message and forward the switch message to a device corresponding to the monitoring apparatus, so that the device sends and receives a command or data by using a backup system bus.

* * * * *